(No Model.)
H. P. HOLT.
LUBRICATOR.
No. 550,887. Patented Dec. 3, 1895.
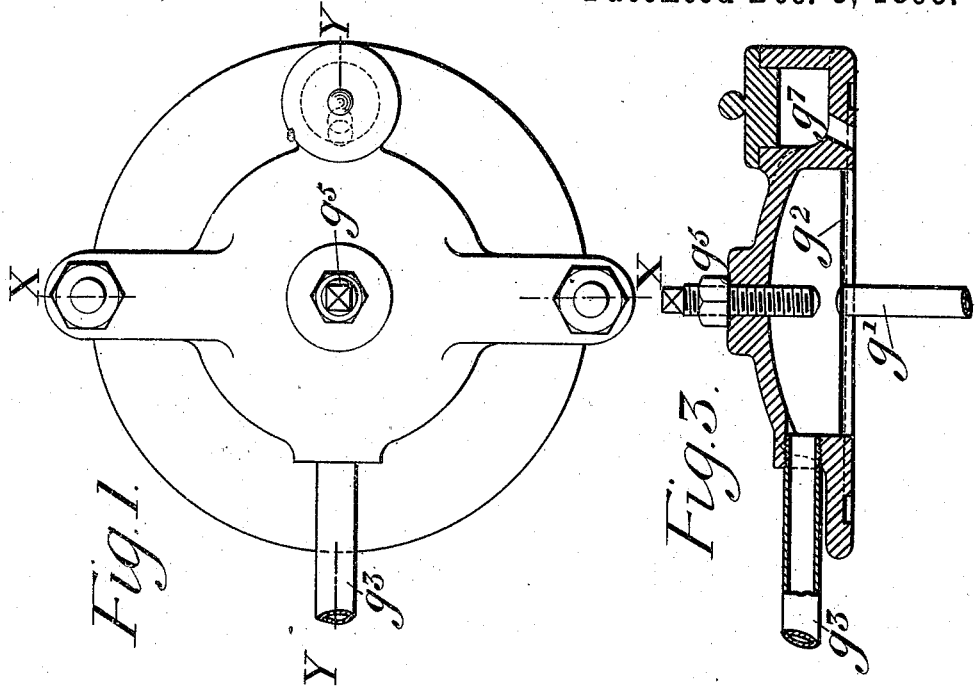
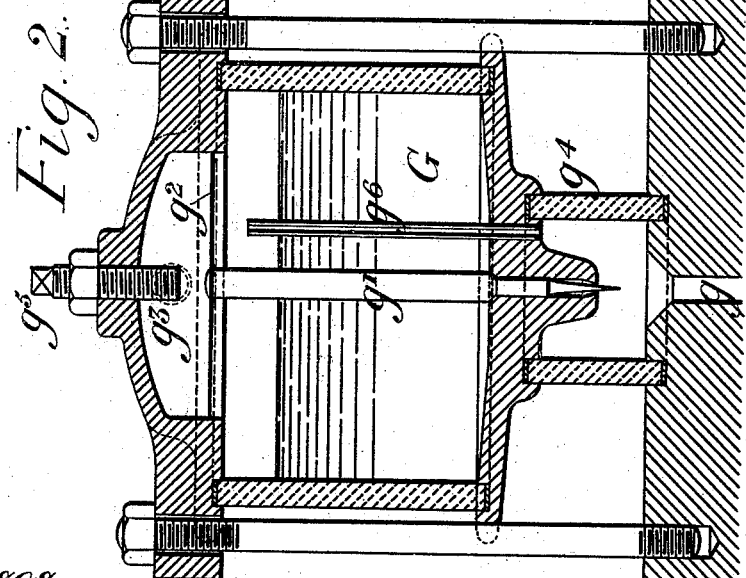
Witnesses.
Philip N. Tilden.
Robert Garrett.
Inventor.
Henry Percy Holt.
By James L. Norris.
Atty.

UNITED STATES PATENT OFFICE.

HENRY P. HOLT, OF LONDON, ENGLAND.

LUBRICATOR.

SPECIFICATION forming part of Letters Patent No. 550,887, dated December 3, 1895.

Application filed April 20, 1895. Serial No. 546,587. (No model.) Patented in France August 4, 1894, No. 240,557, and in Belgium August 4, 1894, No. 111,251.

*To all whom it may concern:*

Be it known that I, HENRY PERCY HOLT, a citizen of England, residing at 22 Chancery Lane, London, England, have invented a certain new and useful Lubricating Apparatus for Gas or Oil Motor Engines, (for which I have obtained patents in France, dated August 4, 1894, No. 240,557, and in Belgium, dated August 4, 1894, No. 111,251,) of which the following is a specification.

My invention relates to apparatus for regularly lubricating the cylinder and piston of a gas or oil motor engine, the amount of lubricant being automatically regulated according as more or less gas or oil vapor is admitted to the cylinder. For this purpose I construct and arrange lubricating apparatus as I shall describe, referring to the accompanying drawings.

Figure 1 is a plan, Fig. 2 is a vertical section on the line X X of Fig. 1, and Fig. 3 is a part vertical section on the line Y Y of Fig. 1, of lubricating apparatus according to my invention arranged on the horizontal cylinder C of a gas or oil motor engine.

G is a reservoir, preferably glass-sided, containing oil and situated over an aperture $g$, leading into a part of the cylinder where it is never uncovered by the piston. At the bottom of the reservoir G there is a hole provided with a valve, the stem $g'$ of which is connected to a disk $g^2$, which operates as a piston and for which a flexible diaphragm might be substituted. Above the disk $g^2$ there is a chamber connected by a pipe $g^3$ with the pipe which supplies gas or oil vapor to the cylinder. Whenever by the suction caused by the charging stroke of the main piston the pressure in the supply-pipe of gas or oil vapor is reduced, the disk $g^2$ rises, raising the valve $g'$ and thus allowing a little oil to flow past the valve-stem into the cylinder. The path of the oil is surrounded by a glass cylinder $g^4$, through which the dropping of the oil can be seen, so that the attendant can regulate the quantity by means of a screw $g^5$, by which the upstroke of the stem $g'$ can be adjusted. A small pipe $g^6$ admits to the space above the oil sufficient air to maintain downflow of the oil when the valve is open. Oil is supplied when required by a feeding-orifice $g^7$, provided with a cap.

When the speed of the engine is too great, the governor usually employed prevents the opening of the valve by which the gas or oil vapor is supplied during a revolution or several revolutions until the speed becomes normal. While the valve remains closed, there is no suction in the supply-pipe and consequently no reduction of pressure above the piston or diaphragm $g^2$. Thus the stem $g'$ does not rise and no lubricant is supplied to the cylinder when no combustion takes place in it.

Having thus described the nature of my said invention and the best means I know for carrying the same into practical effect, I claim—

1. In combination with the cylinder of a gas or oil motor engine having an aperture leading to the interior thereof, of a lubricating device secured to the cylinder and having an outlet passage communicating with the aperture in the cylinder, a valve working in said outlet passage and having a plate or diaphragm upon its upper end, and an air exhausting pipe leading from the lubricating device above the plate or diaphragm to the oil or gas supply pipe of the cylinder, whereby the air above said plate is exhaused at intervals and the valve thereby operated and cylinder supplied with lubricant, substantially as described.

2. In combination with the cylinder of a gas or oil motor engine having an aperture leading to the interior thereof, of an oil reservoir secured to the cylinder and having an outlet passage communicating with the aperture in the cylinder, an air chamber in the upper part of said oil reservoir, a valve operating in the outlet passage, a plate or diaphragm secured to the top portion of the valve stem and working in the air chamber, and an air exhaust pipe leading from the air chamber to the gas or vapor supply of the cylinder whereby the air is exhausted at intervals and the valve operated to supply the cylinder with lubricant, substantially as described.

In testimony whereof I have signed my name to this specification, in the presence of two subscribing witnesses, this 8th day of April, A. D. 1895.

HENRY P. HOLT.

Witnesses:
 OLIVER IMRAY,
 JNO. P. M. MILLARD.